United States Patent [19]
Castleman et al.

[11] 4,048,736
[45] Sept. 20, 1977

[54] LAMINATED COMPOSITE SHEET PACKAGING MATERIAL

[75] Inventors: Howard H. Castleman, Charlotte; Henry G. Stewart, Harrisburg, both of N.C.

[73] Assignee: Package Products Company, Inc., Charlotte, N.C.

[21] Appl. No.: 548,895

[22] Filed: Feb. 11, 1975

[51] Int. Cl.$^2$ .............................................. A44C 3/00
[52] U.S. Cl. ........................................ 40/2 R; 428/500
[58] Field of Search ................ 40/2 R, 306, 135, 310, 40/136; 428/500; 206/46, 245

[56] References Cited
U.S. PATENT DOCUMENTS

| | | | |
|---|---|---|---|
| 2,648,097 | 8/1953 | Kritchever | 427/223 |
| 2,935,418 | 5/1960 | Berthold et al. | 117/47 |
| 3,106,032 | 10/1963 | Morgan | 40/2 R X |
| 3,198,692 | 8/1965 | Bridgeford | 161/155 |
| 3,218,224 | 11/1965 | Osborn | 161/247 |
| 3,250,384 | 5/1966 | Perino | 206/47 |
| 3,297,518 | 1/1967 | Maschner et al. | 161/184 |
| 3,317,038 | 5/1967 | Bade et al. | 206/62 |
| 3,343,663 | 9/1967 | Seidler | 206/46 |
| 3,360,412 | 12/1967 | James | 156/229 |
| 3,370,972 | 2/1968 | Nagel et al. | 428/216 |
| 3,457,139 | 7/1969 | James | 161/247 |
| 3,496,061 | 2/1970 | Freshour et al. | 161/254 |
| 3,503,842 | 3/1970 | Kahn | 161/162 |
| 3,526,000 | 8/1970 | Williams | 156/82 |
| 3,539,428 | 11/1970 | James | 156/272 |
| 3,547,754 | 12/1970 | Tokos et al. | 161/165 |
| 3,570,748 | 3/1971 | Coyle et al. | 229/53 |
| 3,575,793 | 4/1971 | Paisley | 161/249 |
| 3,600,267 | 8/1971 | McFedries, Jr. et al. | 161/165 |
| 3,607,519 | 9/1971 | Beyer et al. | 156/192 |
| 3,616,190 | 10/1971 | Shaw | 161/190 |
| 3,619,242 | 11/1971 | Ogawa et al. | 117/46 |
| 3,622,439 | 11/1971 | Manne et al. | 161/184 |
| 3,630,826 | 12/1971 | Rose et al. | 161/190 |
| 3,645,822 | 2/1972 | Widiger et al. | 156/243 |
| 3,671,383 | 6/1972 | Sakata et al. | 161/252 |
| 3,783,067 | 1/1974 | Petzetakis | 156/163 |
| 3,784,434 | 1/1974 | Paisley et al. | 156/280 |
| 3,823,061 | 7/1974 | Frayer et al. | 161/254 |
| 3,823,270 | 8/1974 | Shirmer | 161/165 |
| 3,840,427 | 10/1974 | Brazier et al. | 161/227 |
| 3,884,505 | 5/1975 | Miller | 40/2 R X |
| 3,887,734 | 6/1975 | Chazan | 40/2 R X |

*Primary Examiner*—John F. Pitrelli
*Attorney, Agent, or Firm*—Bell, Seltzer, Park & Gibson

[57] ABSTRACT

A substantially opaque printed heat sealable composite sheet material suitable for use as a packaging material and including a front film of a transparent oriented heat stable polymer, a layer of printing underlying the front film and visible on the outer surface thereof, a rear film of a pigmented polymer of a predetermined color having a readily heat sealable outer surface, and an intermediate film of a substantially opaque pigmented polymer tightly bonded to the inner surface of the front film and to the inner surface of the rear film and serving to increase the opacity of the sheet material and to enhance the brightness and purity of color of the layer of printing.

19 Claims, 5 Drawing Figures

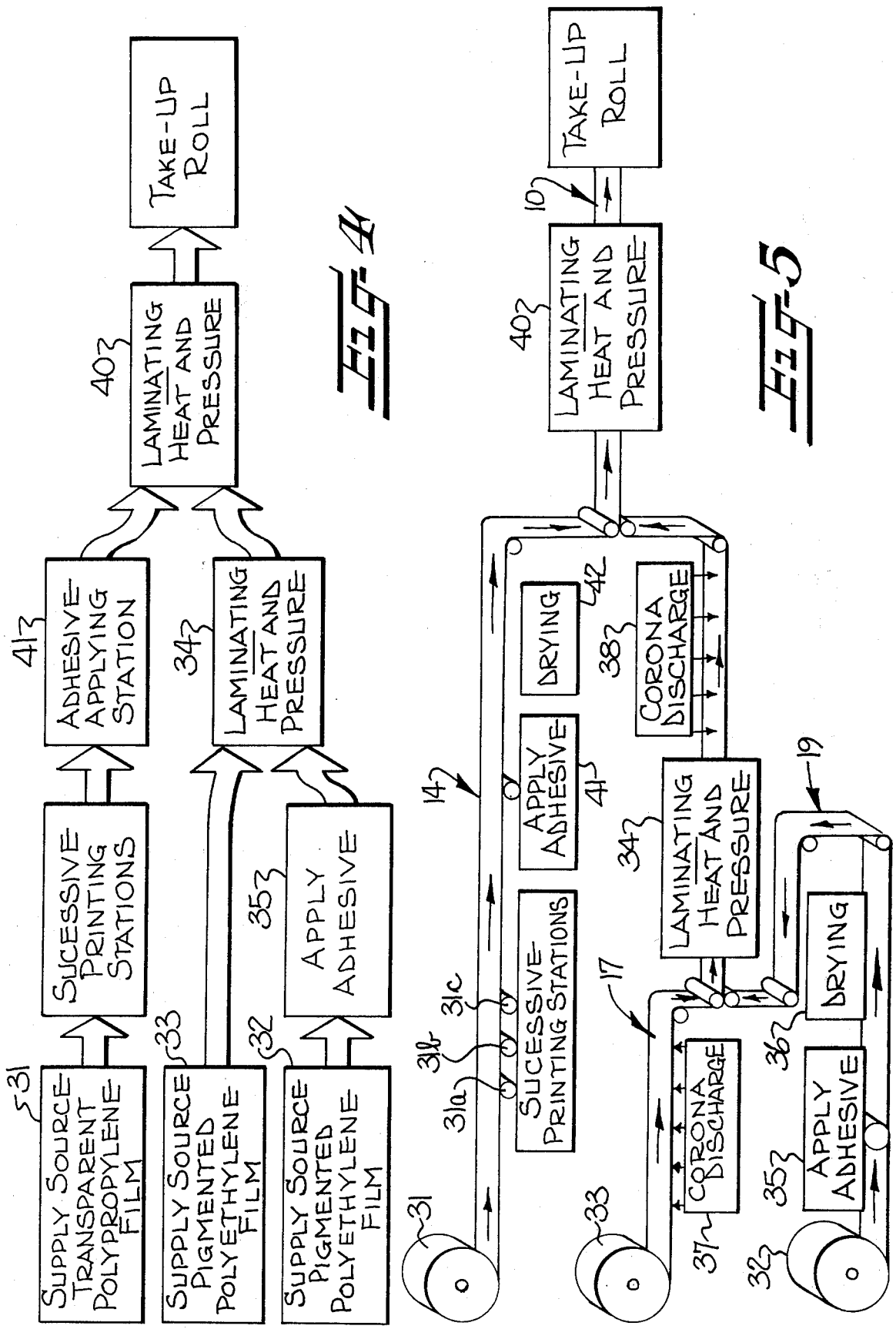

LAMINATED COMPOSITE SHEET PACKAGING MATERIAL

This invention relates to a composite sheet material which is particularly suitable for use in forming relatively heavy gauge reusable flexible packages such as pouches, bags, envelopes, and the like. This invention also relates to a method for forming this composite sheet material.

Many kinds of products are sold in flexible packages which are adapted to serve as a reusable container for storing the product. By way of example, reusable pouches, bags, envelopes, etc. have been employed for packaging such items as wearing apparel, hosiery, etc. Soft plasticized polyvinyl chloride film, commonly called "vinyl", has been popularly employed for forming this type of reusable package, since the vinyl is durable and of relatively heavy gauge as compared to lightweight disposable packaging materials, and since the vinyl has a desirable feel and degree of flexibility for a reusable packaging material. Additionally the vinyl is available in a variety of substantially opaque colors and can be formed into various kinds of packages by heat sealing.

However, vinyl has been found to have a number of limitations or disadvantages when employed as a packaging material. For example, vinyl is relatively expensive as compared to other kinds of sheet packaging material. Additionally, vinyl is somewhat difficult to heat seal, and generally requires relatively inefficient thermal impulse sealing equipment.

Also, when printing designs or other information on the vinyl, the graphics which may be employed are somewhat limited. It is relatively difficult to print brightly contrasting colors on opaque colored vinyl, or on any opaque substrate, particularly when printing light colored indicia against a contrasting darker background. In order to provide indicia in a bright yellow color on a bright red opaque vinyl film background, for example, it is necessary to lay down a relatively thick layer of yellow printing ink in an attempt to prevent the red background from being visible through the yellow printing to cause the printing to have an orange tint. This requires that the printing be done by a slow and relatively expensive method such as silk-screen printing. However, even methods such as silk-screen printing do not provide the purity of color which is often desired.

Additionally, vinyl has been found to possess certain undesirable properties. Many persons who continually handle packages formed from vinyl, as for example, factory workers who insert the products in the packages, find that the vinyl causes skin irritations. Additionally, products contained in vinyl packages are often found to be permeated with an undesirable odor with lingers even after the product is removed from the package. Such odors are particularly unacceptable to customers where the product contained within the package is an article of wearing apparel.

Further, it is quite likely that polyvinyl chloride may become unavailable in the near future, because of recent concern over health hazards involving exposure to vinyl chloride monomer, and possible governmental regulation resulting therefrom.

With the foregoing in mind, it is an important object of this invention to provide a packaging material which is suitable as a substitute for vinyl and which overcomes the aforementioned disadvantages and limitations of vinyl.

More particularly, it is an object of this invention to provide a relatively heavy gauge sheet material which may be readily cut and heat sealed to form reusable packages such as pouches, bags, etc.

It is another object of this invention to provide a packaging material which provides considerable versatility of graphic design, permitting the packaging material to be readily produced with printed indicia thereon in an essentially unlimited number of color combinations.

It is still another object of this invention to provide a packaging material which is strong and flexible and which has a feel and appearance comparable to that of vinyl.

It is still another object of this invention to provide a method of making a packaging material having the above described characteristics.

In providing a packaging material suitable for forming reusable pouches, bags, etc. therefrom, it has been determined that a number of criteria involving appearance, structure, and processing should be taken into consideration. These criteria are listed as follows:

a. Opacity of Packaging Material. It is often desirable that packages formed from the packaging material be opaque so that the shape or form of the product contained therein will not be visible.

b. Opacity of Printing. The printed areas of the package should be similarly opaque.

c. Colors of Packaging Material. The packaging matrial should be available in an essentially unlimited spectrum of colors.

d. Colors of Printing. The package should be capable of bearing printing in one or more colors in an essentially unlimited spectrum of colors, and the color should be pure and unaffected by the background color of the packaging material.

e. Color Combinations. For versatility of graphic design, it should be possible to provide an essentially unlimited number of color combinations between the printed indicia and the background.

f. Strength of Material. The packaging material should be of sufficient strength and durability to permit packages formed therefrom to be reusable, and avoid punching, tearing, splitting, etc.

g. Heat Sealable. The packaging material should be readily heat sealable and form strong seals.

h. Cuttable. The packaging material should be readily severable along either straight or curved lines in any direction and should form clean, smooth cuts. Rough cut edges are extremely undesirable since the packages may contain wearing apparel or hosiery which could be readily snagged or damaged by rough edges.

i. Hand. The packaging material should be flexible and have a hand or feel of a similar softness as vinyl.

j. Gauge. The sheet material should be uniform in gauge thickness and available in thicknesses ranging from about three to about six mils.

k. Curl. Vinyl has no inherent curl. The packaging material should have little or no curl. If any curl is present at all, it should be toward the inside or unprinted surface.

The packaging material should not curl under varying ambient humidity conditions.

l. Non-Wrinkling or Cracking.

m. Inert and Non-Irritating.

In addition, the cost of the packaging material and the cost of forming packages therefrom should be held as low as possible, and preferably considerably lower than the cost of vinyl.

Bearing the foregoing in mind, it is a further object of this invention to provide a packaging material and a method of making the same, wherein the above listed criteria are satisfied.

SUMMARY OF THE INVENTION

It was determined, in accordance with this invention, that the above objects could be best satisfied by forming the packaging material as a composite or laminated stucture.

More particularly, the composite packaging material of this invention is a laminate of three films, with the outer film being a transparent heat stable polymer and with a layer of printing being provided underlying the transparent front film layer so as to be visible on the outer surface of the composite material. An intermediate film of pigmented substantially opaque polymer is provided underlying the printed layer and serves to increase the opacity of the composite sheet material and to enhance the brightness and purity of color of the layer of printing. A rear film of pigmented copolymer of a predetermined color is provided tightly bonded to the opposite surface of the intermediate film and having a readily heat sealable outer surface.

The layer of printing includes printed indicia of at least one predetermined color visible over certain areas of the front film and a printed background visible over other areas of the front film, the background being a predetermined color contrasting to the color of the printed indicia. The layer of printing preferably extends over substantially the entire surface of the film and is protected from scratching and wear by the overlying transparent film.

In the preferred method of this invention, the layer of printing is reverse printed directly upon the inner surface of the transparent front film. However, the printing may, if desired, be applied to the intermediate substantially opaque film.

This composite structure was found to provide a versatility of graphic design and color selection far exceeding that obtainable by printing directly on the upper surface of opaque vinyl or other opaque substrates. The composite material of this invention may be printed in multiple colors of high purity and of any color combination, includng light colored indicia against a dark opaque background. Moreover, this printing is accomplished economically and at high speeds by methods such as gravure or flexographic printing.

To further enhance the brightness and purity of color of the printed indicia and the background, and to further increase the opacity of the sheet material, the layer of printing may include an additional layer in the form of a white printed masking layer overlying the printed indicia and the printed background.

The rear film may, if desired, be selected of a pigmented color which substantially matches the predetermined color of the printed background so that the packaging material has the appearance of a single ply sheet with the same predominant background color front and rear, and with brightly contrasting indicia visible on the front surface.

In providing a composite material having the structural properties and processability characteristics most desirable in a packaging material, while having a feel, appearance, and flexibility similar to soft plasticized polyvinyl chloride packaging film, it was found tht the composition and physical properties of the respective layers of the composite sheet material are important. The outer transparent layer, it was discovered, should preferably be formed of a biaxially oriented polypropylene film, while the intermediate film is preferably an opaque white pigmented polyethylene film. The rear film is preferably a pigmented polyethylene film of any predetermined pigmented color having a readily heat sealable outer surface.

It was found that the suppleness and degree of flexibility which is usually desired in a packaging material used for forming reusable bags, pouches, etc. is best achieved when the composite material is formed from three preformed films adhesively bonded together. However, the versatility of graphic design which is provided in accordance with this invention may be achieved by forming the composite material by other methods, although possibly with some difference in the flexibility, suppleness, or other properties. For example, the substantially opaque intermediate film may be extrusion laminated between the preformed rear film and the previously printed front film. Or, both the intermediate and the rear film may be extrusion coated onto the printed front film. Generally speaking, however, adhesively laminating preformed films is the preferred method of making the composite material.

Additional objects and features of this invention will become apparent from the following detailed description and examples of illustrative embodiments of the invention, and from the accompanying drawings, in which FIG. 1 is a perspective view showing the upper surface of the composite sheet material of this invention with indicia visible thereon, and showing the respective films comprising the composite sheet in exploded or separated relation at the left side of the figure for purposes of illustration;

FIG. 4 is a simplified block diagram of a method of making the composite sheet material in accordance with the invention; and FIG. 5 is a somewhat more detailed schematic diagram illustrating a method of making the composite sheet material.

Figure 1:
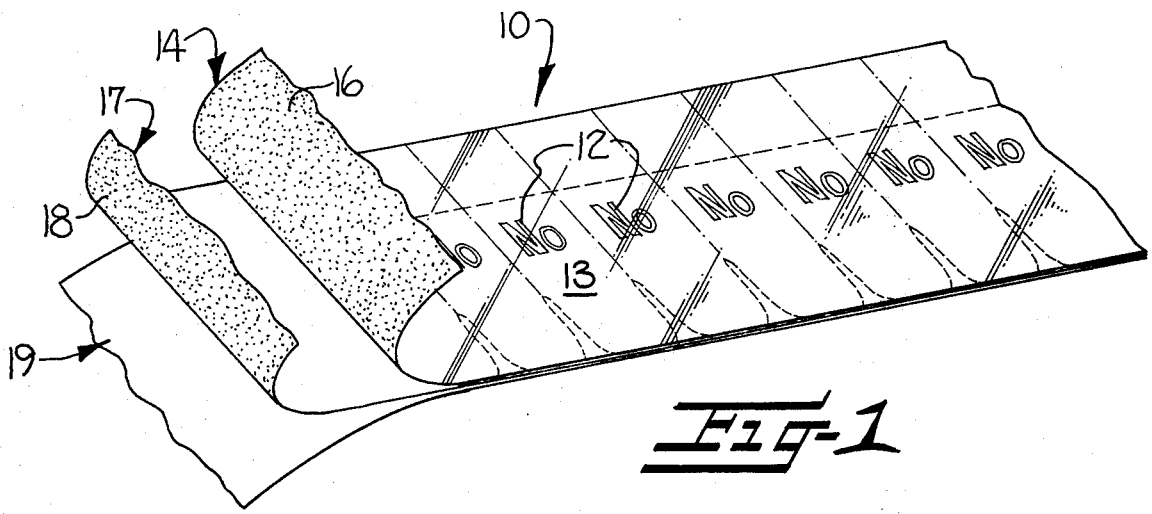

Referring now more particularly to the drawings, the composite sheet material in accordance with this invention is designated at 10 in FIG. 1, with the upper surface thereof bearing printed indicia 12. Indicia 12 is illustrated herein as the word "No" repeating along the length of the sheet, although the indicia may obviously include any words or printed information or design and may appear in one or more colors. As illustrated, the indicia 12 appears against a background 13 of a single color contrasting to the color of the printed indica 12. It will be appreciated, however, that the background 13 may also comprise more than one color if desired.

Figure 2:
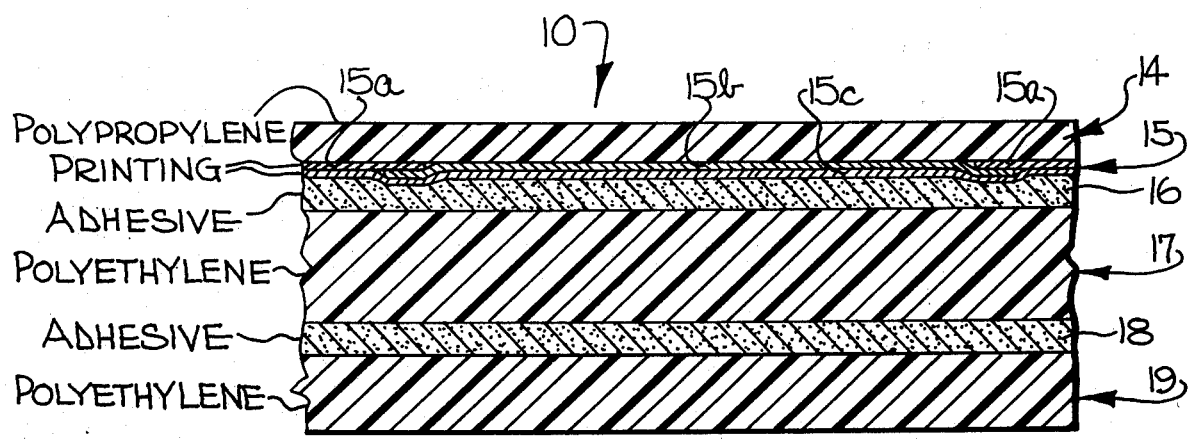
FIG. 2 is a greatly enlarged cross-sectional view of a portion of the composite sheet material shown in FIG. 1.

As seen both from FIGS. 1 and 2, the composite sheet 10 is formed of three laminated films. The front film 14 comprises a transparent oriented heat stable polymer film having an inner surface which is receptive to printing inks. The film should be sufficiently heat resistant to withstand direct heating by a heated iron or anvil during heat sealing without burning, melting, or degradation.

Beneath the transparent front film 14 and visible on the front surface 11 of the composite sheet is a layer of printing 15. The layer of printing 15 is preferably printed directly upon the ink receptive inner surface of the transparent front film 14 and, as illustrated, may comprise several layers of different color printing inks, as described in more detail herein.

The printed inner surface of the front film 14 is adhesively bonded, by adhesive layer 16, securely to one surface of a pigmented intermediate film 17. The intermediate film 17 is substantially opaque and preferably pigmented a pure white by a suitable opaque white pigment such as titanium dioxide. Intermediate film 17 thus serves as a masking or opacifying layer in the composite to provide a white background for the printing 15 so as to enhance the purity of color thereof. The film 17 also serves to increase the opacity of the composite sheet. As illustrated, the intermediate film is considerably thicker than either of the other films forming the laminate to obtain a high level of opacity in the composite sheet. To achieve optimum opacity without losing flexibility and other desirable physical properties of the composite sheet, the intermediate film should preferably have a thickness of about one-fourth to about two-thirds of the overall thickness of the composite sheet. A thickness on the order of about two mils has been found to provide suitable results for a composite sheet three to six mils in thickness.

The opposite surface of intermediate film 17 is bonded by a layer of adhesive 18, to the rear film 19 of the three-ply composite. Rear film 19 comprises a pigmented oriented polymer having an outer exposed surface which is readily heat sealable. Rear film 19 may be pigmented any desired color, either transparent or opaque. However, it is generally preferred to select the rear film 19 of a color substantially matching the color of the printed background 13 to give the appearance of a unitary (single ply) sheet having the same predominant background color front and rear, and with printed indicia of a contrasting color provided on the front surface.

It will be readily appreciated from the foregoing that the versatility of graphic design and color selection available with the composite sheet material of this invention is attributable primarily to the laminated construction, which permits economically printing by flexographic or gravure methods in any desired colors or combinations thereof and at high speeds, while achieving high opacity both in the background and in the printed indicia.

However, in providing a sheet packaging material which may be easily processed into pouches, bags, and the like, and which has an appearance and feel simulating that of vinyl, the composition and physical properties of the film layers are also important.

Preferably, the front film 14 comprises a transparent biaxially oriented polypropylene film having a glossy outer surface and an inner surface which has been treated, as for example by corona discharge, to enhance printability. The thickness of the front film 14 may be selected as desired, although a thickness of about three-fourths mil has been found suitable for most purposes and readily processable during printing, laminating, and package formation.

While, as noted above, the polypropylene front film 14 is preferably biaxially oriented, it has been found that the composite sheet material is severed or cut most smoothly during subsequent processing and without forming rough or jagged edges when the molecular orientation of the film is greater in the direction parallel to the primary direction of cutting than in the direction perpendicular thereto. As illustrated in FIG. 1, the composite material is adapted to be severed along parallel cut lines extending in the transverse or widthwise direction. Accordingly, the biaxially oriented polypropylene front film 14 preferably has a greater degree of orientation in the transverse direction than in the machine or longitudinal direction.

Intermediate film 17 preferably comprises a white pigmented biaxially oriented polyethylene film in which both surfaces thereof have been treated by suitable surface treatment methods, such as corona discharge, to enhance secure bonding. It will be readily appreciated that resistance to delamination during cutting is important in obtaining clean smooth cuts.

Preferably rear film 19 comprises a pigmented biaxially oriented polyethylene film, which may suitably have incorporated therein from about three to five percent of a heat seal additive such as ethylene vinyl acetate which increases the heat sealability of the film and which also permits incorporating a greater amount of pigment therein. The inner surface of the rear film 19 may be surface treated to enhance bonding.

It should be understood that the term "pigmented film" as used herein refers to a film having a colorant or pigment incorporated therein so as to permanently color the film. This is conventionally done prior to extrusion of the molten polymer to form a film. A "pigmented film" is to be distinguished from a film which has been colored by applying a coating of printing ink to one or both surfaces thereof.

Figure 3:
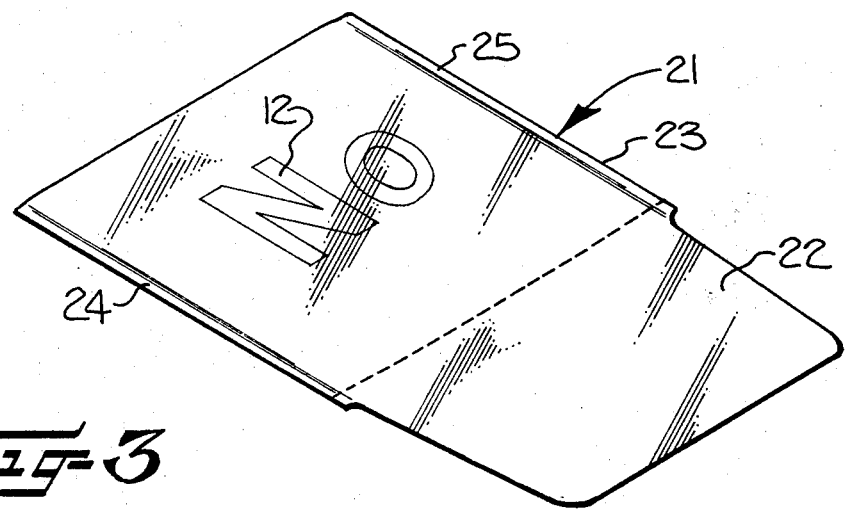
FIG. 3 is a perspective view showing a flexible pouch formed from the composite packaging material of FIG. 1.

FIG. 3 illustrates a flexible pouch, generally designated at 21, formed from the packaging material of FIG. 1. Pouch 21 is formed from the sheet material illustrated in FIG. 1 by folding, heat sealing, and cutting, and includes a flap portion 22 having rounded corners, a double thickness portion 23 formed by folding a portion of the sheet material upon itself so as to define a pocket therebetween, and opposing parallel heat seals 24 and 25 joining opposing faces of the sheet material together. After inserting a product in the pouch, the flap 22 may be folded over the double thickness body portion 23 and secured thereto by suitable means such as adhesive tape, leaving the indicia 12 visible on the upper side of the pouch.

FIGS. 3 and 4 illustrate a suitable method for the production of the laminated packaging material of the present invention. The transparent front film 14 is unwound from a supply roll 30 thereof and advanced to a printing machine 31 and across a plurality of successive printing stations 31a, 31b, 31c where different colors of printing ink are applied to various areas on the inner surface of the front film. The number of printing stations varies depending upon the number of colors being printed. In any event, however, it is preferred that the layer of printing 15 extend over substantially the entire inner surface of the front film.

While the layer of printing may, if desired, be applied to the intermediate film 17, application to the polypropylene front film 14 is preferred since the polypropylene is relatively dimensionally stable (has a high modulus). In a packaging material having repeating printed indicia thereon along its length, longitudinal stretching is undesirable since accurate registration of the printed indicia during subsequent formation of packages is important.

Referring to FIG. 1, where printed indicia 12 of a single color is visible against a printed background 13 of a contrasting color, it should be understood that the order of application of the printing inks defining the printed indicia 12 and the background 13 may vary depending upon the color and opacity of the respective printing inks. FIG. 2, for example, illustrates the composition of the layer of printing 15 where the indicia is of a relatively light and somewhat transparent color, and wherein the background is of a somewhat darker color. As illustrated, the printed layer 15 comprises three successively applied layers of different colors, designated 15a, 15b, and 15c. Layer 15a represents the background color which is printed first at the first printing station 31a, with open areas or "windows" corresponding to the desired lettering or indicia being left unprinted. At the second printing station 31b these open areas or windows are printed with the color of the indicia, indicated at 15b in FIG. 2. It will be noted that the indicia layer 15b may overlap the background layer 15a in some areas. Additionally, in order to increase the opacity of the sheet material and to enhance the brightness and purity of color of the printed indicia, a white masking layer 15c is preferably also printed at a third printing station 31c, with the masking layer 15c extending over substantially the entire surface of the front film and overlying both the printed background layer 15a and the printed indicia layer 15b.

When a relatively opaque printing ink is employed, as for example in instances where black indicia is printed on the film, the black may be applied first, since layers of printing ink behind the black printing will not significantly affect the purity of color of the black ink.

Referring again to FIGS. 4 and 5, the rear film 19 and the intermediate film 17 are unwound from respective supply rolls 32, 33 thereof and advanced in a common direction toward and into a laminating station 34 where opposing surfaces of the films are adhesively bonded tightly together. Adhesive is preferably applied to the inner surface of the rear film 19 at an adhesive applying station 35 as the film is being advanced to laminating station 34.

While a number of suitable adhesives are available, best results have been obtained with a solvent-based urethane adhesive which is applied by coating to the inner surface of the rear film 19 in a solvent vehicle, and thereafter dried at a drying station 36 to evaporate the solvent. Laminating is accomplished by passing the combined films across a heated drum or roller and while applying pressure with one or more cooperating nip rolls.

The polyethylene intermediate film 17 is preferably obtained from the supplier with both surfaces thereof corona discharge treated to a high level. The corona discharge treatment of polyolefin surfaces is well known and widely practiced in the production of packaging films. In order to further enhance bonding of the intermediate film 17 to the respective front and rear films 14 and 19, one or both surfaces of the intermediate film 17 are preferably subjected in-line to additional corona discharge treatment. Thus, as illustrated in FIG. 5, one surface of the film 17 is illustrated as being subjected to a corona discharge treatment 37 upon unwinding from the roll 33 and prior to application of adhesive thereto and laminating to the rear film 19. The other surface of the intermediate film 17 is illustrated as being subjected to corona discharge treatment 38 immediately upon emerging from the laminating zone. This preferred application of additional surface treatment must be conducted in-line, since the surface treatment achieved is so high that the film is incapable of being unrolled if thereafter taken up in roll form.

Preferably, and as illustrated, the second in-line corona discharge treatment 38 of the intermediate film 17 occurs immediately as the laminated rear film 19 and intermediate film 17 emerge from the laminating zone so that the exposed surface of the intermediate film 17 is still in a heated condition.

It has been found that the corona discharge treatment is much more effective when applied to a heated surface than when applied at a later stage in the processing after substantial cooling has occurred.

As illustrated, the laminated rear and intermediate films and the printed front film 14 are advanced to a laminating station 40 and bonded securely together and thereafter taken up in roll form.

In order to achieve the greatest adhesion between the printed surface of front film 14 and the intermediate film 17, the adhesive is preferably applied to the printed surface of the front film 14 prior to lamination with the intermediate film 17. Thus, an adhesive applying station 41 and drying station 41 are illustrated for applying adhesive to the printed surface of film 14. The drying station serves also to evaporate any residual solvent in the printing ink and thereby insure a better bond between the layer of printing 15 and the inner surface of the front film.

For purposes of illustration, and without any desire or intent to limit the invention, the following examples set forth specific examples of composite sheet materials in accordance with the present invention.

EXAMPLE I

A printed heat sealable laminated sheet material about five mils in thickness with a bright orange background color on both surfaces and with bright yellow printing appearing on the front surface was produced by laminating together three preformed films as follows:

a. A front film of transparent 0.70 mil biaxially oriented polypropylene. This film is sold under the designation BICOR OP-400S, available from Mobil Chemical Company, and comprises a co-extruded heat set, heat sealable oriented polypropylene with a biaxially oriented homopolymer polypropylene core and with a copolymer polypropylene two-side sealing surface. The film is more highly oriented in the transverse direction than in the machine direction, as seen from its elongation and tensile strength properties. The film has an elongation at break in the machine direction of 475 percent, and in the transverse direction of 45 percent. The film has a tensile strength in the machine direction of 8,500 psi, and in the transverse direction of 40,000 psi.

b. An intermediate film of two mil white opaque polyethylene pigmented with a titanium dioxide pigment. The film is purchased treated on both surfaces to a high degree with a corona discharge surface treatment.

c. A lower film comprising a pigmented heat sealable polyethylene about one and one-half mils in thickness and pigmented a bright orange color. The film contains about three to five percent of an ethylene vinyl acetate additive which increases the heat sealability of the film and permits incorporating more pigment therein.

The laminate was produced in the following manner: The film of transparent biaxially oriented polypropylene was advanced from a supply roll to a high speed web-fed rotary flexographic printing press having a series of printing stations set up for applying three different colors. As the film passed the first and second printing stations, a bright orange background color was applied over one surface of the film, except for certain areas or windows corresponding to the lettering of the indicia. At the next successive printing station, a bright yellow was printed over those areas or windows left unprinted by the prior stations. At the following printing station, the printed surface was overprinted with a white printed layer which was not visible from the front surface of the film but which served to increase the opacity of the layers of printing. The ink system employed is particularly designed for printing on polypropylene film, and comprises a solvent-based polyamide-nitrocellulose ink system. Each color of ink was applied at a rate of about one-fourth pound per 3,000 square feet of printed area.

The intermediate and rear films were laminated together by applying a solvent-based urethane adhesive to the inner surface of the rear film at a rate of about one pound of adhesive per 3,000 square feet of surface area. After drying the adhesive, the two films were firmly joined to one another by passing over a heated roll, heated at about 260° F, while applying pressure to the films. As the combined films left the laminating station, the still heated surface of the white intermediate film was subjected to an additional corona discharge surface treatment. Subsequently, the printed polypropylene film was laminated to the treated surface of the white intermediate film by applying adhesive to the polypropylene film and drying, and thereafter laminating under heat and pressure.

The composite packaging material thus produced had a high gloss finish on both surfaces thereof and had a soft, but flexible and substantial feel or "hand". The bright orange background on both the front and rear surfaces was of uniform color and high opacity. The yellow printed indicia was of high quality and opacity and of pure color.

Pouches of the configuration of the container 21 in FIG. 3 were formed using a sheet of the above packaging material by longitudinally folding the film with the inner surfaces thereof in opposing relation, thereafter forming parallel transversely extending heat seals bonding the opposing inner faces together, and severing along the heat seals. The pouches formed had clean smooth cut lines, and strong smooth heat seals.

EXAMPLE II

A packaging material was formed in a manner similar to that described in Example I except that the transparent front film was formed from 0.73 mil heat set biaxially oriented polypropylene formed entirely from homopolymer polypropylene. This film is sold under the trade designation BICOR LC, available from Mobil Chemical Company. The film has an elongation at break in the machine direction of 350 percent, and in the transverse direction of 60 percent. The film has a tensile strength in the machine direction of 8,500 psi, and in the transverse direction of 35,000 psi.

The transparent front film was prined in four colors with an orchid color being the predominant background color and with contrasting white printed indicia thereon. A small inset of a yellow color was provided in the orchid background to set off or highlight additional black printed indicia.

The four colors were applied in the following manner: At the first printing station the black indicia was printed. At the next printing station the orchid background was printed with open areas or windows being left surrounding the black printing where the yellow inset was to be provided, and in areas where the white lettering was to appear. The yellow was next printed overlying the black printed indicia and the surrounding open area. Finally, a layer of white printing ink was applied over substantially the entire surface of the film to form the white indicia where the film was left unprinted and to further increase the opacity and brightness of color in the other areas previously printed with another color. The rear film was pigmented an orchid color substantially matching the orchid color of the printed background.

The composite packaging material thus produced had a high quality of printing with brightly contrasting colors of high purity.

Pouches produced from this sheet material in the manner described in Example I formed clean smooth cut lines and smooth strong heat seals.

EXAMPLE III

A sheet material was formed in a manner similar to that described in Example I, except that the transparent front film was a 0.75 mil balanced biaxially oriented polypropylene film having a substantially equal amount of orientation in both the machine and in the transverse directions. The film has an elongation in both the machine direction and the transverse direction of 70–100 percent and a tensile strength of 30,000 psi in both directions. This film is available from Hercules, Incorporated under the designation HERCULES B500. Pouches formed from this film were readily heat sealable and formed smooth strong heat seals. However, upon cutting to form pouches, the sheet material had a tendency to tear rather than form smooth cut lines.

EXAMPLE IV

A sheet material was formed in a manner similar to that described in Example I, except that the transparent front film was formed of three-fourths mil polyethylene. It was found that when heat sealing this sheet material, the outer polyethylene layer was not sufficiently heat resistant, with the result that the outer surface would burn or melt before sufficient heat could be applied to cause fusing or sealing of the inner surface.

EXAMPLE V

A sheet material was formed in a manner similar to that described in Example I, except that the transparent front film was formed of cast polypropylene. Like the product of the previous Example, the outer cast polypropylene layer was not sufficiently heat resistant for accomplishing satisfactory heat sealing.

EXAMPLE VI

A sheet material was formed in a manner similar to that described in Example I, except that the transparent front film was formed of cellophane. The resulting product had a hand not at all approaching the feel of vinyl. Also the cellophane was found to have a short shelf life, making it undesirable for use as a reusable container. Additionally, the cellophane was highly moisture sensitive and caused curling of the composite sheet material in response to changes in humidity.

EXAMPLE VII

A sheet material was formed in a manner similar to that described in Example I, except that the transparent front film was formed of nylon. This product was also found to be unsuitable, since the nylon also changes size in response to changes in humidity, and thus caused a curling problem.

EXAMPLE VIII

A sheet material was formed in a manner similar to that described in Example I, except that the transparent front film was formed of Mylar (polyethylene terephthalate). The product had an undesirable stiffness and would not cut cleanly when forming packages therefrom but had a tendency to tear and form rough cut edges.

In the drawings and specification, there has been set forth a preferred embodiment of the invention, and although specific terms are employed, they are used in a generic and descriptive sense only and not or purposes of limitation.

That which is claimed is:

1. A substantially opaque printed heat sealable composite sheet material suitable for use as a packaging material and characterized by versatility of graphic design and color selection, said sheet material comprising, in combination:
    a front film of a transparent heat resistant polymer,
    a layer of printing underlying said front film and visible on the outer surface of the film,
    a rear film of pigmented polymer of a predetermined color having a readily heat sealable outer surface, and
    an intermediate film of a pigmented polymer tightly bonded to the inner surface of said front film and to the inner surface of said rear film and serving to increase the opacity of the sheet material and to enhance the brightness and purity of color of said layer of printing.

2. A composite material according to claim 1 wherein the layer of printing is applied to the underside of said front film and extends over substantially the entire surface thereof.

3. A composite material according to claim 1 wherein the layer of printing includes printed indicia of at least one predetermined color applied to certain areas of the inner surface of said front film and a printed background applied to other areas of the inner surface of said front film, said background being of a predetermined color contrasting to the color of said printed indicia.

4. A composite material according to claim 3 wherein said predetermined color printed background is applied over the major portion of the surface area of the front film, and wherein said rear film is pigmented a color substantially matching the predetermined color of the printed background, said composite sheet material thereby having a common predominant background color on opposite surfaces thereof with printed indicia of at least one contrasting color visible on one surface thereof.

5. A composite material according to claim 3 wherein the layer of printing includes a white printed masking layer overlying the printed indicia and the printed background and serving to enhance the brightness and purity of color of said printed indicia and said background and to increase the opacity of the sheet material.

6. A composite material according to claim 1 wherein said intermediate film is substantially opaque and pigmented with a white pigment.

7. A composite material according to claim 1 wherein said intermediate film comprises a preformed substantially opaque film bonded to said front film and to said rear film by an adhesive.

8. A composite material according to claim 7 wherein both surfaces of said intermediate film are surface treated to promote bonding.

9. A heat sealed flexible pouch formed from the composite sheet material of claim 1.

10. A substantially opaque printed heat sealable composite sheet material suitable for use as a packaging material and characterized by versatility of graphic design and color selection, said sheet material comprising, in combination:
    a front film of transparent oriented polypropylene,
    a rear film of pigmented polyethylene of a predetermined color having a readily heat sealable outer surface,
    an intermediate film of substantially opaque pigmented polyethylene positioned between said front film and said rear film and serving to increase the opacity of the sheet material and
    a layer of printing between said front transparent film and said intermediate substantially opaque film and visible on the outer surface of the sheet material, with the underlying intermediate film serving to enhance the brightness and purity of color of the layer of printing.

11. A composite material according to claim 10 wherein the rear film includes heat seal additive on the exposed outer surface thereof.

12. A composite material according to claim 10 wherein the sheet material is in the form of a roll of a predetermined width, and wherein the polypropylene front film is biaxially oriented, and is more highly oriented in the widthwise direction than in the longitudinal direction.

13. A heat sealed flexible pouch formed from the composite sheet material of claim 10.

14. A substantially opaque printed heat sealable composite sheet material suitable for use as a packaging material and characterized by versatility of graphic design and color selection, said sheet material being about three to six mils in thickness and comprising, in combination:
    a preformed front film of transparent biaxially oriented polypropylene,
    a layer of printing tightly adhered to the inner surface of said front film and visible on the outer surface of the film,
    a preformed rear film of heat sealable pigmented polyethylene,
    a preformed intermediate film of pigmented polyethylene positioned between said front film and said rear film and serving to increase the opacity of the sheet material and enhance the brightness and purity of color of said layer of printing,
    a layer of adhesive securely bonding the printed inner surface of said front film to one surface of said intermediate film, and
    a layer of adhesive securely bonding the inner surface of said rear film to the opposite surface of said intermediate film.

15. A composite material according to claim 14 wherein the opposite surfaces of said intermediate film are corona discharge treated to enhance secure bonding.

16. A composite material according to claim 15 wherein the inner surface of said rear film is also corona discharge treated to enhance secure bonding.

17. A composite material according to claim 14 wherein the layers of adhesive comprise a urethane adhesive.

18. A composite material according to claim 14 wherein the layer of printing includes printed indicia of at least one predetermined color extending over certain areas of the inner surface of said front film, a printed background of a predetermined color contrasting to the color of said printed indicia extending over other areas of the inner surface of said front film, and a white printed masking layer overlying both the printed indicia and the printed background and extending over substantially the entire inner surface of said front film and serving to enhance the brightness and purity of color of said printed indicia and said background and to increase the opacity of the sheet material.

19. A substantially opaque, printed heat sealable composite sheet material suitable for use in forming flexible pouches, bags, and similar packages and characterized by versatility of graphic design and color selection, said sheet material comprising, in combination:

a preformed front film of transparent biaxially oriented polypropylene of a thickness of about three-fourths mil, a layer of printing tightly adhered to the inner surface of said front film and including printed indicia of at least one predetermined color over certain areas of the inner surface of said front film and a printed background over other areas of the inner surface of said front film, said background being of a predetermined color contrasting to the color of said printed indicia, a preformed rear film of heat sealable polyethylene of a thickness of about one and one-half mils and being pigmented a color substantially matching the predetermined color of said printed background, a preformed intermediate film of substantially opaque white pigmented polyethylene of a thickness of about two mils having the opposite surfaces thereof treated to promote bonding, said intermediate film being tightly bonded to the printed inner surface of said front film and to the inner surface of said rear film and serving as a masking layer to increase the opacity of the sheet material and to prevent the color of said rear film from affecting the purity of color of said printed indicia.

* * * * *

UNITED STATES PATENT AND TRADEMARK OFFICE
CERTIFICATE OF CORRECTION

PATENT NO. : 4,048,736
DATED : September 20, 1977
INVENTOR(S) : Howard H. Castleman and Henry G. Stewart It is certified that error appears in the above-identified patent and that said Letters Patent are hereby corrected as shown below:

Column 3, line 25, "copolymer" should be --polymer--.

Column 4, line 3, "tht" should be --that--.

Column 8, line 28, "41", second occurrence, should be --42--

Signed and Sealed this

Third Day of January 1978

[SEAL]

Attest:

RUTH C. MASON
*Attesting Officer*

LUTRELLE F. PARKER
*Acting Commissioner of Patents and Trademarks*